H. CHRISTMAN.
Trap for Birds.

No. 218,161.  Patented Aug. 5, 1879.

WITNESSES
Franck L. Ourand
J. J. McCarthy

INVENTOR
Harry Christman
By H. J. Ennis
ATTORNEY

UNITED STATES PATENT OFFICE.

HARRY CHRISTMAN, OF PHILADELPHIA, PENNSYLVANIA.

IMPROVEMENT IN TRAPS FOR BIRDS.

Specification forming part of Letters Patent No. 218,161, dated August 5, 1879; application filed March 21, 1879.

*To all whom it may concern:*

Be it known that I, HARRY CHRISTMAN, of Philadelphia, in the county of Philadelphia and State of Pennsylvania, have invented certain new and useful Improvements in Trap-Cages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
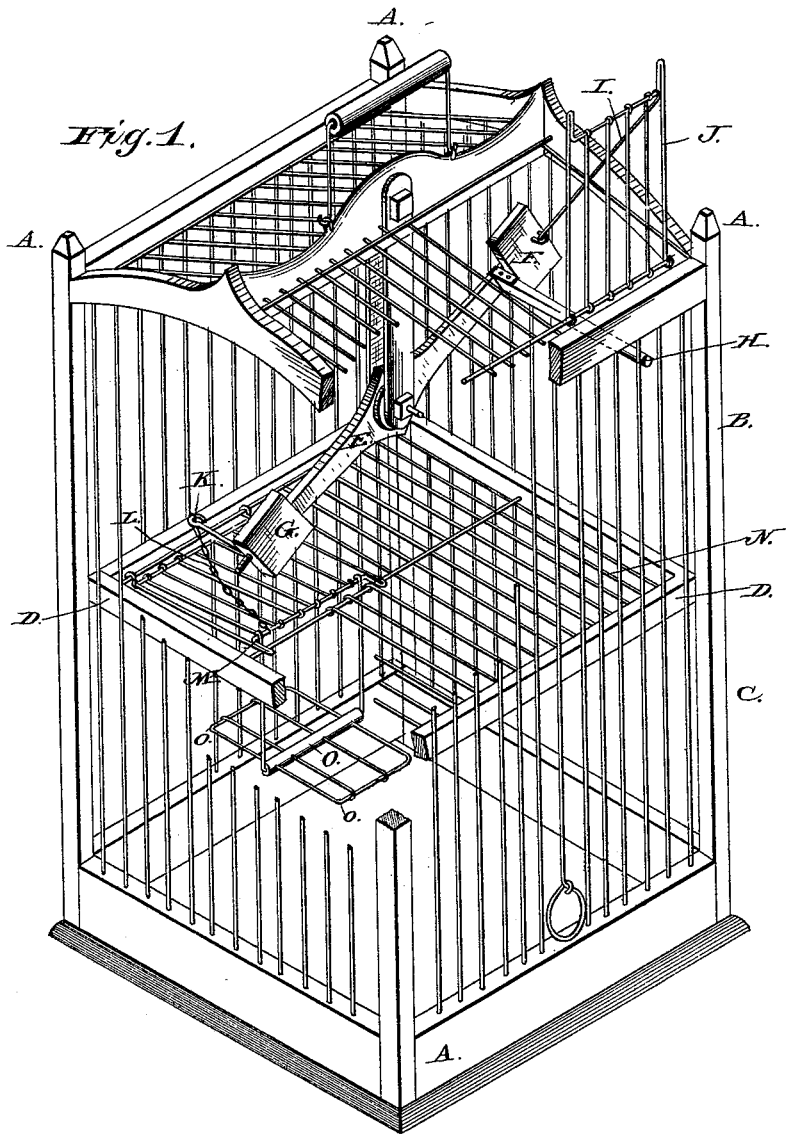
Figure 2:
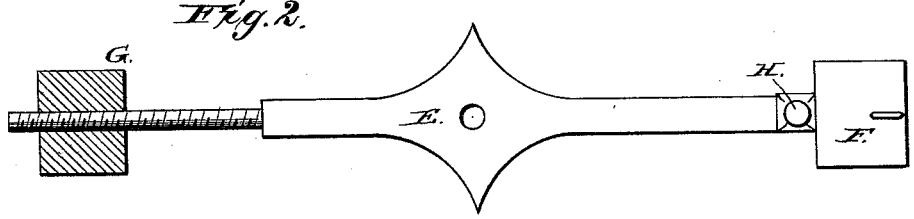

Figure 1 is a view in perspective of my improved cage-trap with a corner removed to show the operating mechanism, and Fig. 2 is an elevation showing the operating-lever with the adjustable weight in section.

This invention has relation to that class of "victim-set traps" in which the cage proper is divided into two apartments, the doors of which are so connected by a lever that the opening of the one will close the other, and both being operated by the victim.

In the drawings accompanying this invention similar letters of reference indicate like parts of the invention.

A A A A are the four sides of a bird-cage as ordinarily constructed, and it is divided into two compartments or sections, B and C, by the wire floor or partition D, placed about midway.

A lever, E, is suspended from the center of the top of the trap, and is provided at one end with a fixed weight, F, and at the other with an adjustable weight, G, the adjustability being obtained by having the end of the lever E screw-threaded and the weight G correspondingly threaded, so that it may be readily moved to any desired position on the lever E.

The lever E is provided at one end with the weight F, said weight being provided with the pitman I, which is connected to the trap-door J, the operation being this—that as the weight F ascends the pitman I opens the trap-door J, and the perch H is raised into the opening. The other end of the lever E, having the weight G, has an arm, K, to which is attached a short chain, L, connected to the trap-door M, located in the partition or floor N, and opening upward.

The door M has a swinging perch, O, depending from it, said perch being provided with a wire frame, o, so operating that when the trap-door M is raised the perch O and frame o fill the opening.

The operation of the invention is as follows: The trap being set in the position shown in Fig. 1, a bird alights on the perch H, which overbalances the lever E, causing that end to go down and draw down the trap-door J, and at the same time raising the lower trap-door, M, causing the perch O and frame o to be raised up and fill the opening.

The bird being then in the upper compartment, B, naturally seeks the perch O, which as it alights on it drops and lowers the bird into the lower compartment, C, drawing the trap-door M down and closing it in. At the same time the motion of the other end of the lever E sets the door J open in position to trap another bird.

Having thus described my invention and the operation of the same, what I claim as new and useful, and desire to secure by Letters Patent of the United States, is—

In a victim-set trap for birds, the lever E, provided with the perch H, adjustable weight G, and fixed weight F, having the pitman I, in combination with the doors J and M, swinging perch O, and frame o, substantially as shown and described.

In testimony that I claim the foregoing I have hereunto set my hand this 21st day of March, 1879.

HARRY CHRISTMAN.

Witnesses:
E. H. BEADFORD,
H. J. ENNIS.